July 7, 1931. O. U. ZERK 1,812,916
RESISTANCE UNIT
Filed Jan. 24, 1929 2 Sheets-Sheet 1

Inventor
Oscar U. Zerk
By Williams Bradbury
McCaleb & Hinkle
Attys.

July 7, 1931.  O. U. ZERK  1,812,916
RESISTANCE UNIT
Filed Jan. 24, 1929   2 Sheets-Sheet 2

Inventor
Oscar U. Zerk
By Williams Bradbury
McCaleb & Hinkle
Attys.

Patented July 7, 1931

1,812,916

UNITED STATES PATENT OFFICE

OSCAR U. ZERK, OF CHICAGO, ILLINOIS, ASSIGNOR TO ALEMITE CORPORATION, OF CHICAGO, ILLINOIS, A CORPORATION OF DELAWARE

RESISTANCE UNIT

Application filed January 24, 1929. Serial No. 334,680.

My invention pertains to resistance units and more particularly to resistance units adapted to form part of a centralized lubricating system. Lubricating systems of the so-called centralized type comprise, in general, a reservoir or other source of lubricant supply, a pump for withdrawing lubricant from the reservoir and forcing it to the bearings requiring lubrication, a system of piping connecting the pump with the bearings, and metering devices adjacent the bearings to apportion the amount of lubricant supplied to each bearing. In some instances the pump is dispensed with and the lubricant supplied to the bearings under the force of gravity.

An object of my invention is to provide a new and improved resistance unit adapted to form part of a centralized lubricating system for the purpose of apportioning the amount of lubricant supplied to the different bearings.

Another object is to provide a resistance unit which is simple and economical to manufacture and which is sturdy enough to withstand the vibration commonly associated with various types of machinery.

Another object is to provide a new and improved method of mounting a strainer in such a unit.

Another object is to provide special dirt separating means which removes the larger particles of dirt from the lubricant before it reaches the strainer and thereby prevents clogging of the strainer.

Other objects and advantages will be apparent as the description proceeds.

Referring to the drawings.

Figure 1:
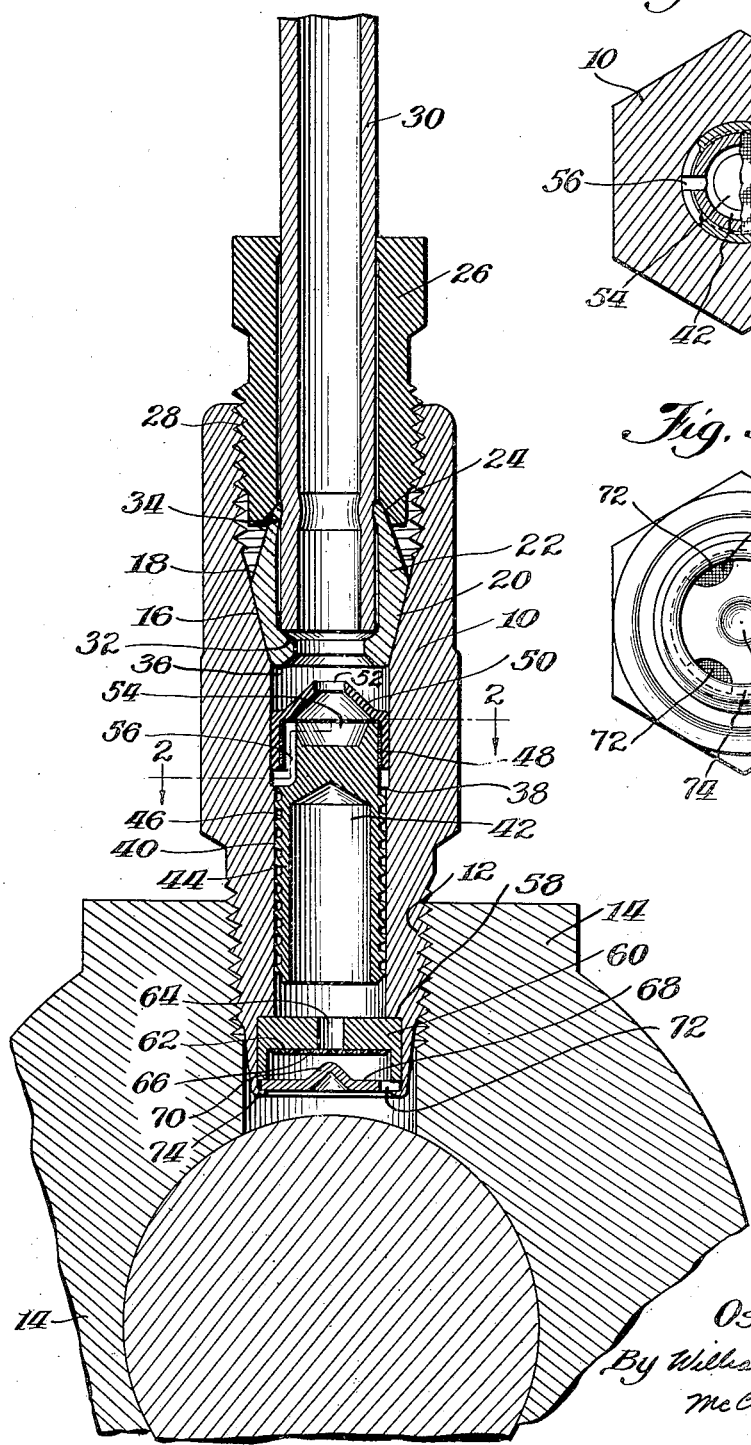
Figure 1 is a sectional view of a preferred embodiment of my invention, illustrating the same applied to a bearing.
Figure 2:
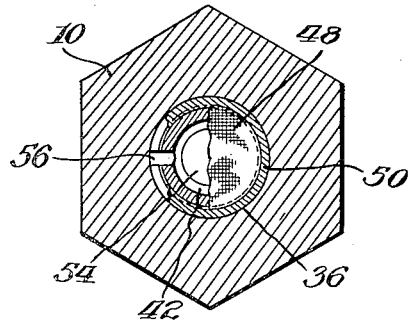
Figure 2 is a section on the line 2—2 of Figure 1.
Figure 3:
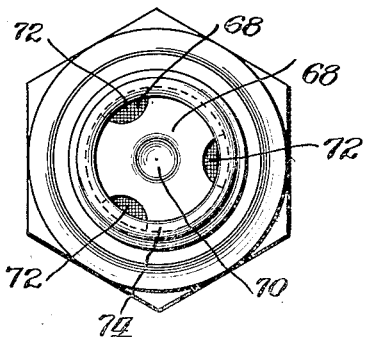
Figure 3 is a bottom view of a resistance unit of Figure 1.

Referring to the embodiment of the invention disclosed in Figure 1, my new and improved resistance unit has a body 10 threaded at its lower end, as indicated at 12, for attachment to a supporting part shown as the bearing 14 in Figure 1. The upper end of the body 10 has a tapered bore 16 adapted to receive a compression sleeve or coupler ring 18 having an externally tapered part 20 fitting snugly in the tapered bore 16. The upper end of the compression sleeve 18 is reversely tapered, as indicated at 22 and the extreme upper end of this sleeve is received in a recess 24 in the lower end of a tubular nut 26 threaded into the upper end of the body at 28.

A pipe 30, which connects the body 10 with a pump or other source of lubricant supply, extends through the tubular nut 26 and down into the compression sleeve 18 where the lower end of the pipe rests against a shoulder 32. When the nut 26 is screwed firmly into the body 10 the compression sleeve 18 is deformed, as indicated at 34, and firmly interlocks the pipe 30 and body 10 in lubricant-tight connection.

The lower end of the bore 16 merges into an axially extending bore 36 terminating at a shoulder 38 which serves to connect the bore 36 with a slightly smaller bore 40 in which a high resistance plug 42 is inserted. The resistance plug has a threaded exterior 44 press fitted into the bore 40 to retain the plug in place and co-operating with the wall of the bore 40 to define a helical passageway 46 offering high resistance to the passage of lubricant.

The upper end of the plug 42 is of reduced diameter and provides a smooth cylindrical surface over which is fitted a cup-shaped metal screen 48. The screen 48 is held in place on the upper end of the plug 42 by a cap 50 having a cone-shaped upper end in the top of which is located an opening 52.

The cone-shaped portion of this cap 50 tends to prevent clogging of the strainer 48 by separating the larger particles and some of the finer particles of dirt from the lubricant before reaching the strainer 48. When the resistance unit is placed in an upright position, as indicated in Figure 1, the tendency is for the dirt particles to strike against the outer surface of the upwardly projecting cone-shaped portion of the cap 50 and to travel down this surface and collect between the base of the cone and the wall of the bore 36. When the resistance unit is placed in a horizontal position these particles of dirt will collect between the lower surface of the cone and the lowermost portion of the wall of the bore 36. That part of the upper end of the resistance plug 42 which lies immediately beneath the strainer 48 is provided with a recess 54 which receives the lubricant passing through the strainer and from whence the lubricant is conducted by a vertical passageway 56 to the inlet end of the high resistance passageway 44.

The lower end of the bore 40 terminates at a shoulder 58. A valve seating member 60 rests against the shoulder 58 and has a valve seat 62 surrounding a passageway 64. A valve disc 66, made of oiled silk, commonly known in the trade as Empire cloth, is held against the valve seat 62 by capillary attraction. The lower end of the member 58 forms an abutment for a valve retaining washer 68 provided with a central projection 70 for limiting movement of the valve disc 66 away from its seat and further provided with cut away portions 72 in its periphery to provide for the flow of oil therethrough. The extreme lower end of the body 10 is turned over, as indicated at 74, to retain the member 58, valve 66 and washer 68 in place.

In this embodiment the threaded portion of the resistance plug 42 is shown as extending substantially 5/6 of the entire length of the bore 38, but it is to be understood that different lengths of resistance plugs may be used to provide different resistances to the flow of lubricant in accordance with the needs of the bearings to which they are attached. Thus a bearing requiring a relatively large amount of lubricant would be provided with a resistance unit having a relatively short resistance plug and therefore a relatively low resistance, whereas a bearing requiring relatively little lubricant would be provided with a resistance unit having a long resistance plug and therefore offering high resistance to the flow of lubricant. This resistance may also be obtained by using resistance plugs with threads of different cross sections.

Figure 4:
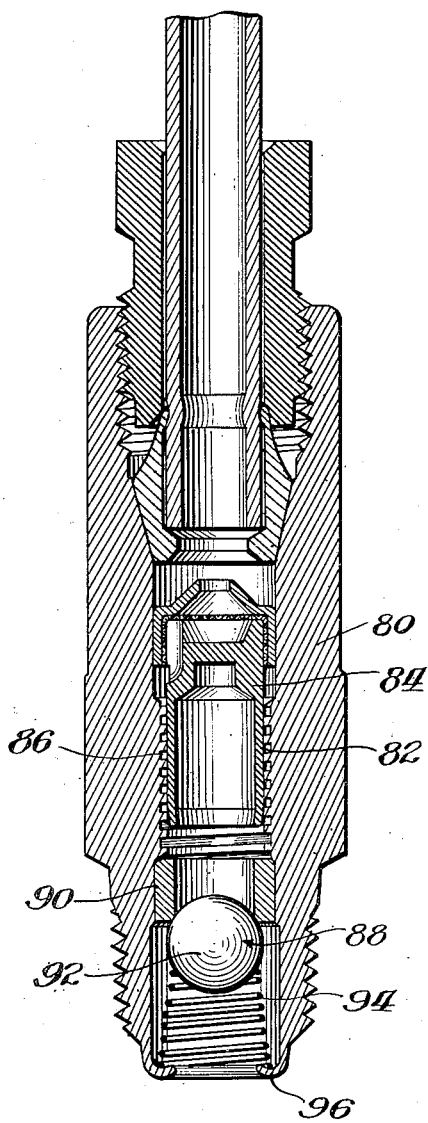
Figure 4 is a sectional view of a second embodiment of my invention.

The embodiment illustrated in Figure 4 is generally similar to that of Figure 1. In this embodiment, however, the body 80 of the resistance unit is provided with a threaded bore 82 which receives the main portion of the resistance plug 84 and in this embodiment the entire exterior of the resistance plug 84 is of one diameter and presents a cylindrical surface. The resistance passageway 86 is formed by the threaded bore 82 and the cylindrical surface of the resistance plug 84.

In this embodiment I have illustrated a conventional type of ball check valve 88 in place of the unique check valve which forms part of the embodiment illustrated in Figure 1. A ring 90 is press fitted in the lower end of the body 80, just below the threaded bore 82, and forms a seat for the ball 92 of the check valve 88. The ball 92 is urged toward its seat by a spring 94 resting on the inturned end 96 of the body 80.

In the embodiments illustrated in Figures 1 and 4 the lower ends of the resistance plugs have been bored out. This accomplishes a dual purpose: It lightens the resistance plug, thereby reducing the possibility of the plug being shaken loose by vibration, and it also affords a saving in the cost of the unit, since resistance units of the type described in this application are commonly made of brass and the value of the material thus saved more than off-sets the additional expense resulting from this boring operation.

Figure 5:
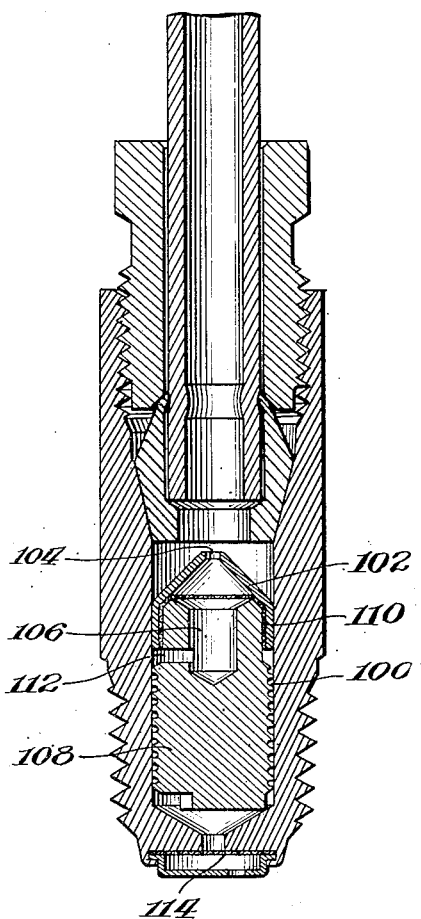
Figure 5 is a sectional view of a still further embodiment of my invention.

The embodiment illustrated in Figure 5 is similar to the embodiment illustrated in Figure 1 in that in the embodiment of Figure 5 the threads 100 are formed in the resistance plug. In this embodiment, however, the threads are shown as of U-shaped cross section, whereas in the other embodiments the threads are illustrated as having a square cross section or substantially so. In this figure the cap 102 is provided with a higher cone and the opening 104 at the top of the cone is smaller than the corresponding openings in the caps of the other figures. This construction further increases the dirt catching abilities of the cap. In this figure the recess 106 in the upper end of the resistance plug 108, which lies just below the strainer 110, extends well down into the body of the plug to a point opposite the upper end of the thread 100 and is connected to the latter by means of a radial passageway 112.

In this embodiment I make use of a still further form of valve indicated, generally, by the reference numeral 114. This valve is fully described in the co-pending application of Ernest W. Davis, Serial No. 74,424, filed December 9, 1925, and need not be described in detail herein.

It is to be understood that my invention is not limited to the exact details or embodiments illustrated in the drawings but may assume many forms, and that the scope of my invention is limited only by the following claims.

Having thus illustrated and described several preferred embodiments of my invention, what I claim and desire to secure by United States Letters Patent is:

1. In lubricating apparatus of the class described, a resistance unit comprising a body having a bore therein, a plug located in said bore and co-operating therewith to define a passageway of relatively high resistance to flow of lubricant therethrough, said plug having an axial inlet and a conduit connecting said inlet with said passageway, a well in the end of the plug in communication with the axial inlet, and a strainer located at said inlet and said well.

2. In lubricating apparatus of the class described, a resistance unit comprising a body adapted to be secured to a bearing requiring lubrication, said body having a bore therein, a plug located in said bore and co-operating therewith to define a passageway of relatively high resistance to the flow of lubricant therethrough, said plug having an inlet leading to said passageway, a well in the end of the plug in communication with said inlet a strainer extending across said inlet and said well, and a dirt catcher clamping said strainer to said plug.

3. In lubricating apparatus of the class described, a resistance unit comprising a body having a threaded bore therein, a resistance plug co-operating with said threaded bore to define a passageway of relatively high resistance to the flow of lubricant therethrough, a strainer extending across the inlet to said passageway, and a well in the end of the plug which is in communication with the said inlet, and a dirt catcher serving to separate some of the impurities from the lubricant before it reaches said strainer.

4. In lubricating apparatus of the class described, a resistance unit comprising a body having a bore therein, a resistance plug co-operating with said bore to provide a passageway of relatively high resistance to the flow of lubricant therethrough, said plug having an axially located inlet communicating with said passageway, and a strainer extending across said inlet and having a flange surrounding the upper end of said plug.

5. In lubricating apparatus of the class described, a resistance unit comprising a body having a bore therein, a resistance plug co-operating with said bore to provide a passageway of relatively high resistance to the flow of lubricant therethrough, said plug having an axially located inlet communicating with said passageway, a strainer extending across said inlet and having a flange surrounding the upper end of said plug, and a cap-like member surrounding said flange and having a conical dirt catching portion provided with a relatively small passageway therethrough.

6. In lubricating apparatus of the class described, a resistance unit comprising a body having an end adapted to be secured to a bearing and a second end adapted to be connected to a lubricant supply pipe, said body having a bore therein connecting said supply pipe with said bearing, a plug located in said bore and co-operating therewith to define a passageway offering high resistance to the flow of lubricant therethrough, a strainer and dirt separator clamped to the inlet end of said plug, and a non-return valve in said body and located between said plug and said bearing.

7. In a lubricating apparatus of the class described, a resistance unit comprising a body portion having a bore therein, a resistance plug cooperating with said bore to provide a passageway of relatively high resistance to the flow of lubricant therethrough, a well in the end of said plug merging with an axially located inlet communicating with said passage, a strainer extending across said inlet and said well having a flange surrounding the upper end of said plug, and a cap-like member surrounding said flange and having a conical dirt-catching portion provided with a relatively small passageway therethrough.

In witness whereof, I hereunto subscribe my name this 21 day of January, 1929.

OSCAR U. ZERK.